G. D. POGUE.
MAXIMUM DEMAND INSTRUMENT.
APPLICATION FILED MAY 12, 1916.
1,265,247.
Patented May 7, 1918.
5 SHEETS—SHEET 1.
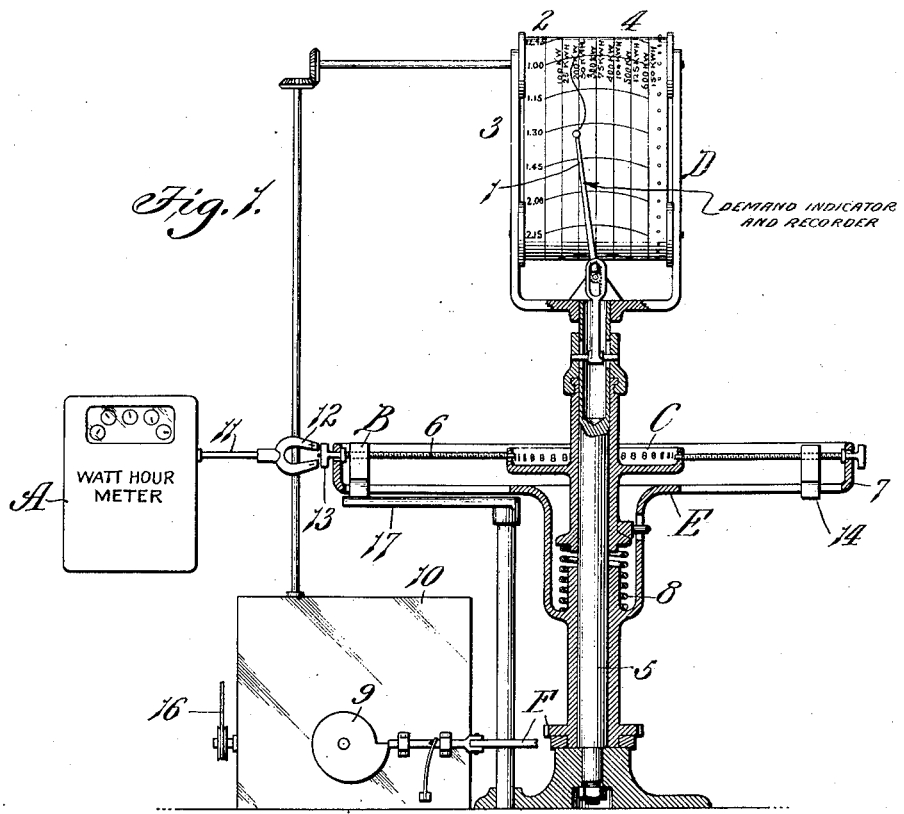
Fig. 1.
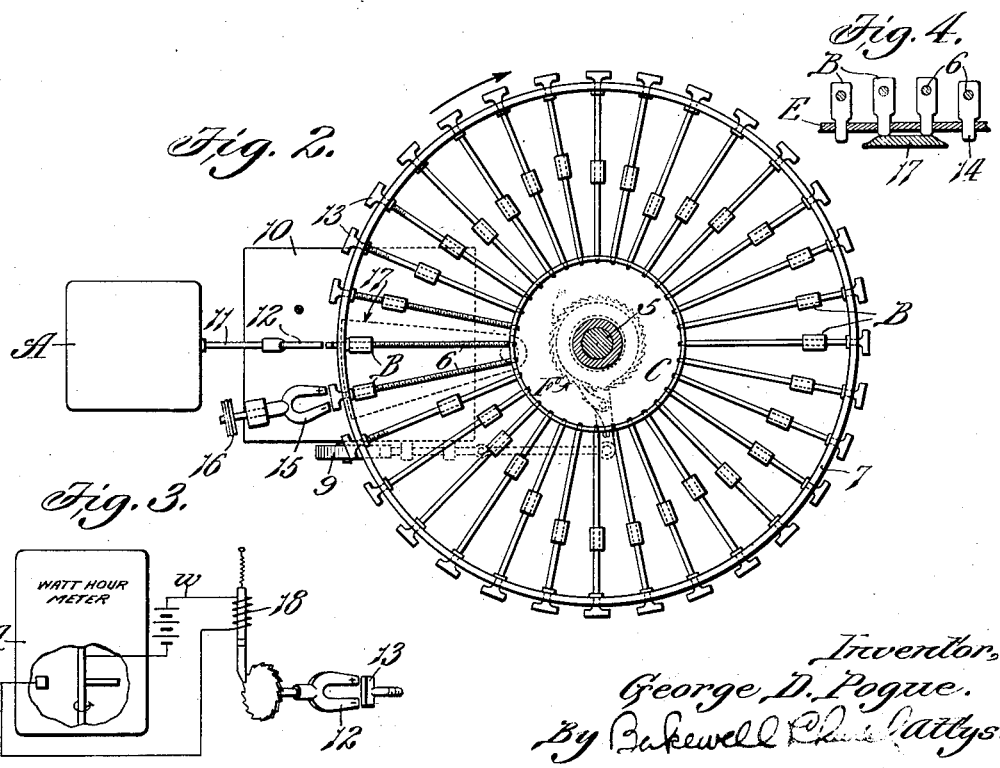
Fig. 2.
Fig. 3.
Fig. 4.
Inventor,
George D. Pogue.
By Bakewell Cornwall Attys.

G. D. POGUE.
MAXIMUM DEMAND INSTRUMENT.
APPLICATION FILED MAY 12, 1916.
1,265,247.
Patented May 7, 1918.
5 SHEETS—SHEET 2.
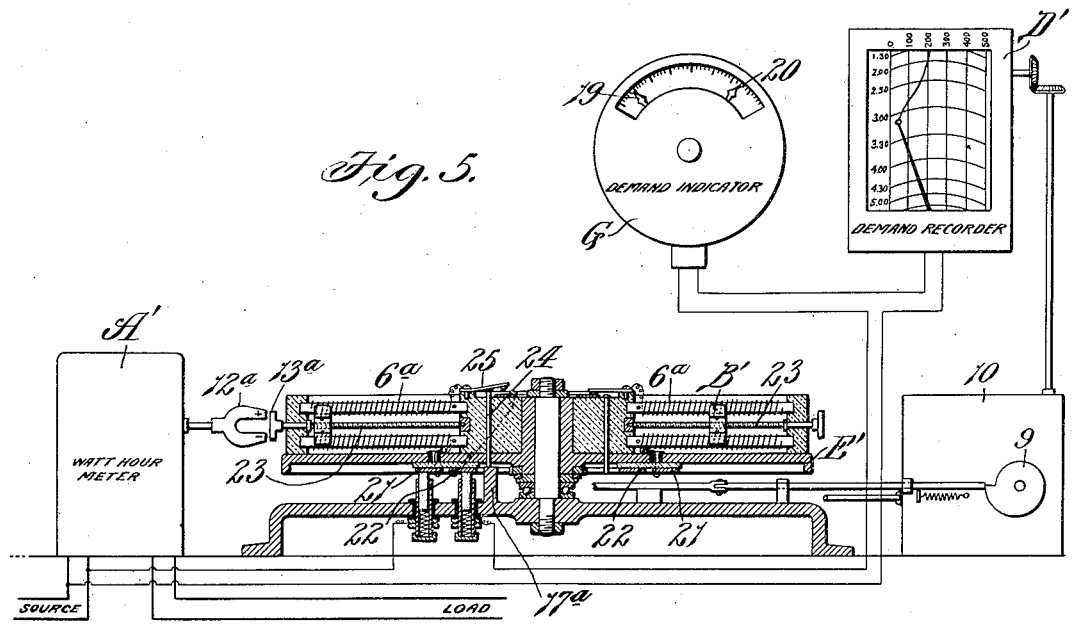
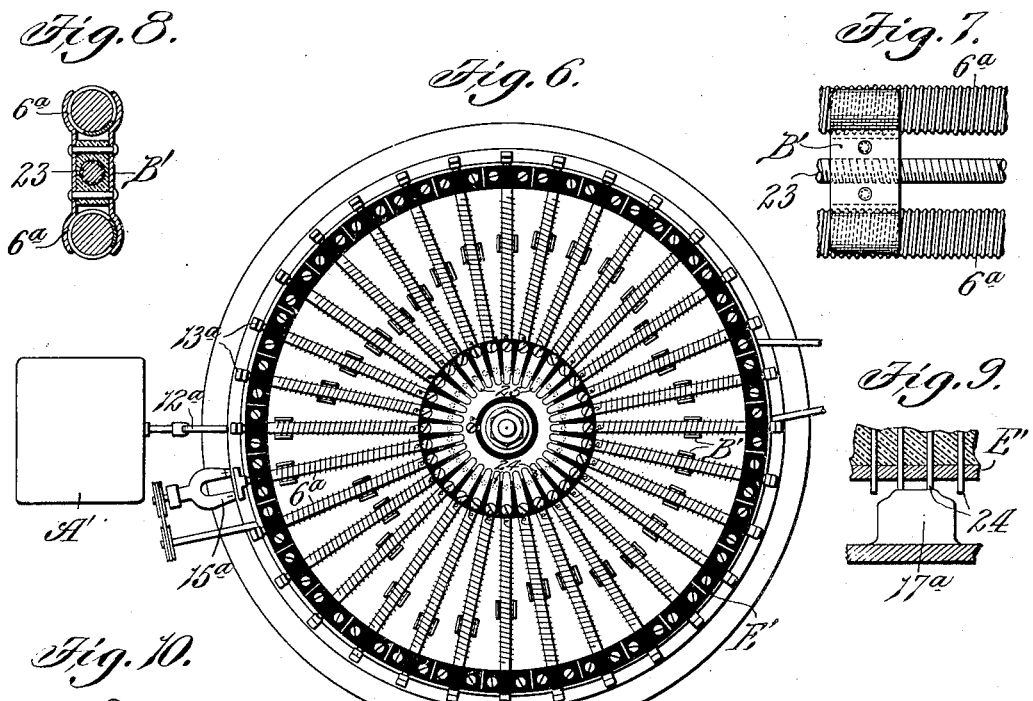
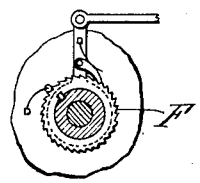
Inventor,
George D. Pogue.
By Bakewell Church Attys.

G. D. POGUE.
MAXIMUM DEMAND INSTRUMENT.
APPLICATION FILED MAY 12, 1916.

1,265,247.

Patented May 7, 1918.
5 SHEETS—SHEET 3.

Inventor,
George D. Pogue.
By Bakewell & Cornwell Attys.

G. D. POGUE.
MAXIMUM DEMAND INSTRUMENT.
APPLICATION FILED MAY 12, 1916.

1,265,247.

Patented May 7, 1918.
5 SHEETS—SHEET 4.

Inventor,
George D. Pogue.
By Bakewell          Attys.

G. D. POGUE.
MAXIMUM DEMAND INSTRUMENT.
APPLICATION FILED MAY 12, 1916.
1,265,247.
Patented May 7, 1918.
5 SHEETS—SHEET 5.
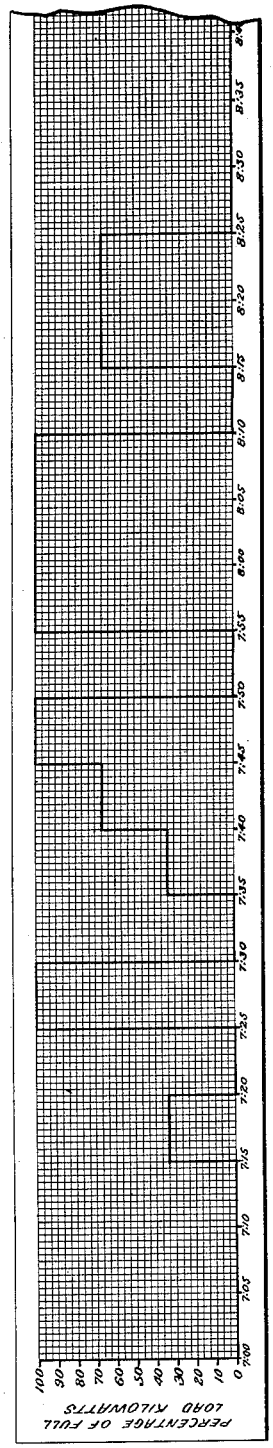
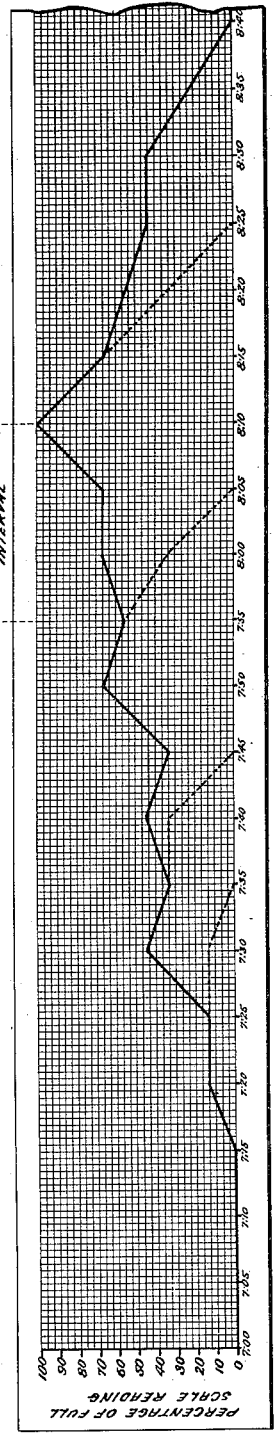
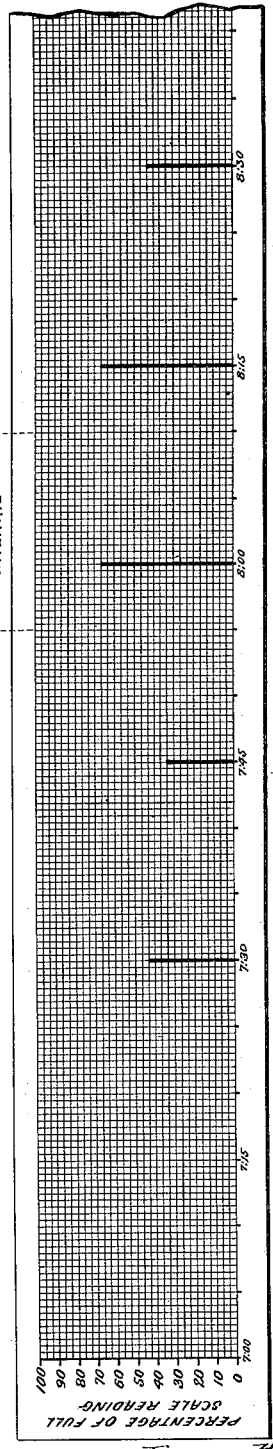
Inventor,
George D. Pogue.
By Bakewell & Cornwell Attys.

UNITED STATES PATENT OFFICE.

GEORGE D. POGUE, OF ST. LOUIS, MISSOURI.

MAXIMUM-DEMAND INSTRUMENT.

1,265,247.  Specification of Letters Patent.  Patented May 7, 1918.

Application filed May 12, 1916. Serial No. 97,156.

*To all whom it may concern:*

Be it known that I, GEORGE D. POGUE, a citizen of the United States, residing at St. Louis, Missouri, have invented a certain new and useful Improvement in Maximum-Demand Instruments, of which the following is a full, clear, and exact description, such as will enable others skilled in the art to which it appertains to make and use the same.

This invention relates to maximum demand instruments such as are used by public utility concerns engaged in the production, distribution and sale of electrical energy, the instrument being employed for determining the maximum average demand made by a consumer during an interval of prescribed length, like a fifteen minute interval or a thirty minute interval occurring at any time during a fiscal period, like a month or year.

In the distribution and sale of electrical energy for lighting, power or other purposes, it has long been recognized that in order to insure equity in rates as between various classes of consumers; or, to express it in another way, in order that the selling price shall in all cases bear proper relation to total cost of manufacture, that more information is required for rate making or billing purposes than that which is furnished by the commonly used watt-hour meter. For example, one consumer whose monthly consumption is ten thousand kilowatt hours might make a maximum demand on the system of one hundred kilowatts, while another consumer, likewise using ten thousand kilowatt hours per month, might make a maximum demand of only twenty kilowatts. The former consumer should pay a higher total charge per kilowatt hour than the latter for the reason that it requires five times the capacity in generating and distributing apparatus to serve him.

Such wide differences in the load factors of various consumers, as illustrated in the preceding example, have led to the very general use of a system of charging for electrical energy in which the total charge is made up of two elements, one a specified amount per month per kilowatt of maximum demand, the other a given rate per kilowatt hour.

A considerable increase in an electrical demand, if continued for only a short interval, will result in an inappreciable rise in the temperature of generating and distributing apparatus. For example, if in starting an electric motor the demand on the system rose to a value one hundred per cent. over normal for that particular consumer, but lasted only a small fraction of a minute, it would have little effect, as far as the heating of the generating and distributing apparatus is concerned, but, if a considerable increase in load be imposed upon the system for, say, fifteen or thirty minutes, it will manifest itself in an appreciable rise of temperature in the generating and distributing apparatus. From the foregoing it will be seen that an instrument for this purpose should indicate or record the greatest demand, not as measured instantaneously, but as accurately averaged over a suitable interval; for instance, a fifteen minute interval or a thirty minute interval; in other words, the instrument should express the maximum average demand occurring during a continuously shifting interval of fixed length or duration.

For the purpose of ascertaining the maximum average demand during an interval of specified length many forms of instruments have been devised. Those in most common use heretofore may be divided into three general classes, one including various forms of thermal devices which depend on heat or heat storage for the indication or record; another class including various forms of instruments which indicate or record integrated demands occurring during a series of separate, successive, non-lapping, predetermined clock intervals each of fixed length, this second class usually comprising a clockwork mechanism, or some equivalent, and a watt-hour meter; and a third class including various forms of graphic or curve-drawing instruments. In this last class the kilowatt hours consumed during a specified interval or the average demand in kilowatts may be closely approximated by the use of a planimeter.

A fundamental disadvantage of the thermal instrument lies in the fact that when a current of constant value begins and continues to flow through it, the indications or readings resulting from the temperature rise will represent points on an upwardly-swinging hyperbolic or logarithmic curve. Readings made at any point before equilibrium is reached, therefore, fail to indicate the true average value for the preceding specified interval of demand, and if the current flowing through the instrument is reduced in value or discontinued altogether, the indications or readings resulting from the temperature drop will represent points on a downwardly-swinging hyperbolic or logarithmic curve.

Referring to the second class, heretofore all instruments comprising a watt-hour meter and a clock-work mechanism, or equivalent, have been designed to record all of the integrated demands over a series of separate, non-lapping time blocks or clock intervals, consecutive, equal and predetermined, such, for instance, as 9:00 to 9:15, or 9:15 to 9:30. It will be seen that in an instrument arranged to operate on the basis of a predetermined clock interval, the real period of maximum demand might occur during an interval lapping across two clock intervals; for example, between 9:08 and 9:23; or, to state it in another way, if the axis or middle of a considerable block of load happens to coincide with the axis or middle of a predetermined clock interval, the instrument will indicate or record one value, while if the axes of the load block and time block do not coincide, then the indication or record of the instrument, when working under the same load conditions, will be different,— usually lower. One form of maximum demand instrument used heretofore consists of a set of numeral wheels somewhat similar to those used in counters or mileage indicators for automobiles or bicycles, but provided with type faces, the rotation of these printing wheels being accomplished directly, or, at least, controlled by a watt-hour meter. At the expiration of equal and predetermined intervals, a clockwork mechanism acts to bring the printing wheels in contact with a tape, recording thereon a number the same as, or bearing a fixed relation to, the watt-hour meter reading. At the expiration of the next succeeding clock interval the same or a larger number is printed on the tape, and so on, the tape moving up a space at each printing, the difference between each number and the next succeeding, of course, representing the kilowatt hours registered during the clock interval. At the end of a month or some other suitable period the tape is removed, and by making subtractions, each number from the next higher, the registrations of the various clock intervals are ascertained and from these the maximum clock interval demand is selected. This, of course, involves considerable clerical labor, with the possibility of error, and carries with it the disadvantage that the consumer cannot enjoy the satisfaction of personally observing the results obtained. In usual practice the tape is removed from the instrument, taken to a point distant from the consumer's premises, and the necessary figures compiled from which his bill is rendered.

Another form of instrument, which can also be included in the second class, consists of a combination of a watt-hour meter, a clock and a curve-drawing mechanism. The pen or stylus is advanced by the moving element of the watt-hour meter and at the expiration of equal and predetermined clock intervals the pen is returned to zero. The clock also drives the chart at a uniform speed at right angles to the direction of pen travel, resulting in a saw-toothed record line, the highest point representing maximum demand and time of occurrence. Still another form which may be included in class two are instruments which indicate the maximum interval demand without recording its time of occurrence. All instruments in the second class possess the common disadvantage that the fluctuations in the load which is being measured are governed by conditions which have no fixed relationship to the passage of time as registered by the clockwork mechanism, any more than the outside atmospheric temperature has relation to the day of the week. A heavy block of load might fall squarely within a predetermined time block, or it might just as readily lap across two time blocks or clock intervals, with widely different results in the indication of the instrument.

Referring to the curve-drawing instruments in class three, which usually comprise a watt meter or ammeter, a clockwork mechanism and a curve-drawing device, the pen or stylus is positioned by the wattage or current flowing, and the clockwork mechanism drives the chart at uniform speed, the chart being spaced off into suitable time intervals. From the graphic record made by these instruments, the amount of energy flowing at any instant may be obtained, or, by the use of a planimeter, the average for any given interval ascertained. For the purpose of determining the maximum average demand for any prescribed time interval this instrument would seem to possess many advantages, but on most loads where the use of maximum demand instruments is justified, the fluctuations in the demand are so frequent and so great that if the chart moves at a reasonably low speed, the curve drawn is at times an illegible blur which cannot be accurately planimetered. When employed to determine maximum average demands during a prescribed interval, the accuracy of the results obtained from the graphic instrument are entirely dependent on the skill of the person assigned to survey the charts and serious errors are therefore possible, which, in large installations, may involve considerable sums of money and result in unpleasant disputes with the consumer. The above instrument also has the disadvantage that the consumer cannot keep himself informed as to results indicated by the instrument—that is, as far as the average demand during a prescribed interval is concerned.

The main object of my invention is to provide a maximum demand instrument that will indicate or record the average demand during a continuously shifting interval of fixed length or duration, and to this end I have devised a maximum demand instrument in which the indication or record at any instant is proportional to the amount of the energy being metered, not at that instant, but instead, is the average amount of energy metered during a prescribed time interval that is measured backward from any instant of observation.

Another object is to provide an instrument that is adapted to be used in conjunction with or in connection with a meter that measures electrical energy, gas, water or any other commodity, or with a counting meter, speed indicator or thermometer, which instrument comprises means for recording or indicating the average consumption of the commodity or the average number of operations of the meter, during a shifting interval of fixed duration; namely, an interval covering a certain period whose beginning or time of commencement is continually changing when the instrument is in operation.

Another object is to provide a maximum demand instrument in which the prescribed interval of demand is divided into a relatively large number of sub-time-intervals of equal length that are represented by a number of elements corresponding to the number of sub-time-intervals, means being provided for varying consecutively the position or condition of said elements according to the amount of energy or commodity passing through the measuring meter that is used in conjunction with the instrument, and a second means for ascertaining the average change in position or condition of all the elements. Where extreme accuracy is required, the total number of elements includes a number of extra elements, so that the element which is being rendered inoperative or set back to zero position and the element that is being rendered operative or whose position or condition is being established by the rate or quantity of flow of the commodity passing through the measuring meter will both be ineffective during the unloading and loading period. It should be understood that each element, after being positioned or conditioned by the measuring meter, remains operative for a period or interval equal to the prescribed interval of demand; or, to express it in another way, the number of active elements corresponds to the number of sub-time-intervals which collectively constitute the prescribed interval of demand.

Another object is to provide an instrument of the character just referred to, that comprises a recording or indicating mechanism which at all times records or indicates the average condition or position of a certain number of the elements that represent subdivisions of the prescribed interval of demand, and thus expresses the average consumption of the commodity during the specified interval of demand.

Another object is to provide a maximum demand instrument in which the pointer or recording device of the indicating or recording mechanism follows a straight line curve or law following a change to a higher but constant value, or following a change to a lower but constant value in the amount of the commodity passing through the measuring meter, instead of following a hyperbolic or logarithmic curve, as in the thermal instruments heretofore in use, thereby causing the instrument to show or record the true average of the amount of the commodity that passed through the measuring meter during the prescribed interval of demand immediately preceding the instant of observation.

Still another object is to provide a maximum demand instrument which is so constructed that if the amount of the commodity passing through the measuring meter is increased to a higher but constant value, the reading of the instrument will immediately begin and will continue to increase, reaching equilibrium at the end of a time interval corresponding in length to the prescribed time interval for which the instrument is particularly designed, there being no further change in the reading of the instrument after equilibrium is reached, if the amount of the commodity passing through the measuring meter remains constant. Other objects and desirable features of my invention will be hereinafter pointed out.

Broadly stated, my invention consists in a maximum demand instrument provided with a recording or indicating mechanism and any kind of a means for causing said mechanism to record or indicate the average consumption of a commodity during a time interval or period of fixed duration that is made up of a certain number of sub-time-intervals, the instrument being so constructed that the time interval or period above referred to is measured backward from any instant at which the record or observation is made. I prefer to provide the instrument with a plurality of elements, each representing a sub-time-interval or division of the agreed interval of demand, and combine said elements with a measuring meter or a counting meter in such a manner that the position or condition of said elements will change automatically according to the flow of the commodity passing through the measuring meter or according to the number of operations of the meter.

The recording or indicating mechanism of the instrument is combined with said elements, or with a means influenced by said elements, in such a manner that said mechanism will record or indicate the average position or condition of those elements which collectively represent the agreed interval of demand. Consequently, the recording or indicating mechanism of the instrument will express the average position or condition of said elements, instead of the actual position or condition of the individual elements.

It is immaterial, so far as my broad idea is concerned, what said elements consist of, and it is also immaterial what means is employed for causing the recording or indicating mechanism to express the average condition or position of said elements. Said elements may consist of weights that are shifted more or less, so as to affect to a greater or less extent the position of a movable member, which is combined with the recording or indicating mechanism in such a manner that the condition of said mechanism will change as the position of said member varies, or each of said elements may consist of a spring which is changed in tension according to the rate of flow of the commodity passing through the measuring meter. Each of said elements may consist of a transformer in which the relative position of the coil to the core is varied according to the rate of flow of the commodity passing through the measuring meter, or said elements may consist of devices that govern the ohmic resistance of an electric circuit, or devices that control a fluid or liquid whose pressure or displacement effects a change in the condition of the recording or indicating mechanism.

In the preferred form of my invention the instrument is so constructed that the prescribed time interval is divided into a relatively large number of sub-intervals; for example, if the agreed demand interval is fifteen minutes, the sub-interval could be one-half of one minute. During each sub-interval a watt-hour meter acts directly or indirectly to change the position or condition of an element corresponding to that particular sub-interval. In an instrument arranged as above there would at all times be thirty elements working, the position or condition of each element being changed consecutively more or less, depending on the then existing speed of the watt-hour meter. Each half minute an element which has just been acted on by the watt-hour meter comes into action, and at the same instant an element which has been in action for fifteen minutes is removed from action and restored to zero position. At all times the thirty elements each of which has been changed in position or condition by the watt-hour meter, act jointly on a common member in such a manner that the average position or condition of all the elements in action is indicated on a scale which is calibrated to read in kilowatts or any other suitable unit. This arrangement may take the form of a pointer which is positioned on a scale by the movement of the common member, or a secondary pointer which remains where placed may be provided so as to leave a record of the maximum reading, or a pen or stylus may be provided which will make a graphic record of the movements of the common member on a chart which travels at uniform speed.

My improved instrument differs from earlier types in that instead of recording the separate and distinct non-lapping integrated demands which occur during each of a series of arbitrary time blocks or clock intervals which are consecutive, equal and predetermined, each representing the specified demand interval in my instrument, the watt-hour meter registration occurring during each sub-interval is transferred to an element which holds the sub-registration on record, or in store, temporarily or for a period corresponding to the whole demand interval for which the instrument is designed.

The instrument is so designed that all the elements, each containing its record of sub-registration, act on a common member in such a manner that the sum or average of all the sub-registrations is expressed by a pointer which swings across a dial, or by other suitable means. During each sub-interval a sub-registration is added to the total indicated by the instrument and another sub-registration which has been carried in the total for a period corresponding to the interval of demand is removed from the total. This action of adding into the total new sub-registrations and eliminating sub-registrations which have already performed their function as far as the making up of the total is concerned, occurs at such short intervals that the total indicated by the instrument represents at all times the substantially true average flow of energy through the watt-hour meter during the immediately preceding whole interval of demand.

Unlike the thermal instruments which have been used heretofore, my instrument possesses a straight-line characteristic, for, when a current of constant wattage value begins and continues to flow through the watt-hour meter, the indications or readings of my instrument will represent points on an upwardly-inclined straight-line curve, any point on the line representing a substantially true index to the average value of the current flowing during the preceding fifteen minute interval. If the current flowing through the watt-hour meter is reduced in wattage or value, or discontinued altogether, the readings of my instrument will represent points on a downwardly-inclined straight line or curve, any point on the line representing the substantially true average value for the preceding fifteen minutes. These lines or curves, while referred to as straight lines, would obviously be saw-toothed in form if the demand interval were divided into a relatively small number of sub-intervals, but a substantially straight and continuous line may be secured without providing an unreasonably large number of sub-divisions.

In one of the forms of my invention herein illustrated the movable elements consist of weights, and in other forms they consist of devices that change the condition of an electric circuit, but as previously stated, it is immaterial, so far as my broad idea is concerned, what said elements consist of. While I have herein illustrated my invention embodied in various forms of maximum demand instruments that are adapted to be used in an electrical supply system, I wish it to be understood that my broad idea is applicable to maximum demand instruments used in systems that supply gas, water and various other commodities. Furthermore, my improved instrument could be used in connection with various other kinds of devices for expressing the average rate of movement of a device during a progressively shifting time itnerval of fixed length or duration, such, for example, as keeping record of the rate at which persons pass through a turnstile, or for recording the rate of production of a machine of a manufacturing plant or the speed of any revolving or reciprocating member. In view of the fact that it is immaterial whether the instrument is equipped with a recording device, a registering device or a combined recording and registering device, I have used the terms "indicating mechanism" and "indicating device" in the claims in the sense that the term indicator is defined in *Knight's Mechanical Dictionary*, namely,—"a marking or recording instrument, or one which makes a visible sign by which the condition of the object or apparatus to which it is attached may be observed." When the instrument is equipped with an indicating device comprising a dial and a hand that moves toward or away from zero on the dial, according to the variations in the average speed of the measuring meter, during the immediately preceding demand interval, said indicating device will also be provided with another hand, which I will term the "maximum indicating hand". The maximum indicating hand is arranged to swing on an axis preferably coinciding with the axis of the hand, and is moved in one direction by the same means that actuates the hand. Unlike the hand, the maximum indicating hand is provided with frictional or other suitable means for holding it fixed in any position in which it is placed.

Whenever desired, presumably at the termination of some suitable fiscal period, like a month, after an observation has been made by an authorized person, the maximum indicating hand may be set back to zero, or to the then existent position of the hand, so as to be in readiness to record the highest position assumed by the hand during the next succeeding fiscal period.

Figure 1 of the drawings is a vertical sectional view of a maximum demand instrument constructed in accordance with my invention.

Fig. 2 is a top plan view of said instrument with the recording mechanism removed.

Fig. 3 is a diagrammatic view, illustrating a slight modification that can be made in the instrument shown in Figs. 1 and 2.

Fig. 4 is a detail sectional view of the loading and unloading platform.

Fig. 5 is a view partly in vertical section and in elevation of another form of instrument constructed in accordance with my invention.

Fig. 6 is a top plan view of the instrument shown in Fig. 5.

Fig. 7 is an enlarged side elevational view of one of the resistance units used in the instrument shown in Fig. 5 and the shiftable element that coöperates with said unit.

Fig. 8 is a vertical cross-sectional view of the part shown in Fig. 7.

Fig. 9 is a detail view of the device used in the instrument shown in Fig. 5 for rendering inoperative the two resistance units whose shiftable elements are being moved into and out of operative position.

Fig. 10 is a detail view of part of the mechanism used in the instrument shown in Fig. 5 for rotating the table on which the resistance units are mounted.

Fig. 16 is a diagram showing variations in the flow of energy.

Fig. 17 is a view illustrating a record produced by my instrument; and

Fig. 18 is a view illustrating diagrammatically a record produced by a predetermined clock interval instrument.

Figure 11:
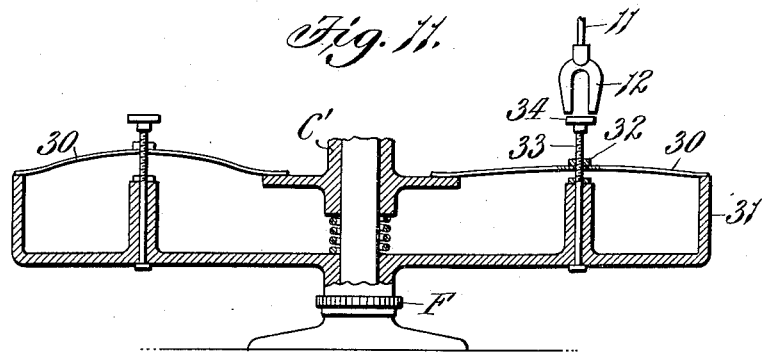
Figs. 11, 12 and 13 are diagrammatic views, illustrating other forms of my invention.

In Fig. 1 of the drawings I have illustrated a maximum demand instrument constructed in accordance with my invention that is adapted to be used in connection with a watt-hour meter for recording the average quantity of the current passing through the meter during a progressively shifting time interval of fixed length or duration. In said figure the reference character A designates a watt-hour meter, and the reference character B designates a plurality of weights, each of which represents a sub-interval or one division of the agreed interval of demand. In the instrument shown in Fig. 1 the member C is combined with a recording mechanism D whose stylus or marking device 1 coöperates with a traveling chart or tape 2 provided with numerals 3 that represent divisions of time, such, for example, as fifteen minute intervals, and also having numbered lines 4 that represent kilowatts of electrical energy. It is immaterial, however, what particular type of recording mechanism is used. Furthermore, it is immaterial whether the instrument is equipped with a recording mechanism, an indicating mechanism or with both a recording and indicating mechanism. The member C is slidingly mounted on a vertically-disposed shaft 5, and the beams 6 are arranged radially around said member C in such a manner that they will exert more or less downward pressure on said member C, according to the position of the weights B. In the construction shown in Fig. 1 each of the weights B is slidingly mounted on a screw-threaded scale beam 6 whose inner end is supported by the member C which is common to all of the beams and whose outer end is fulcrumed on a flange 7 on a table E that is revolubly mounted on the vertically-disposed shaft 5, the member C being supported by a spring 8 which holds said member in such a position when all of the weights B are inoperative that the marking device 1 of the recording mechanism will stand at zero. Under control of the meter A these weights B are moved consecutively one at a time, from the outer end of the beam toward the inner end, the amount or extent of movement being directly proportional to the average speed, or number of revolutions of the meter during the corresponding sub-interval. Inasmuch as the inner ends of all the beams rest on the common member C which is yieldingly supported by the spring 8, it is obvious that the relative movement of the member C will give continuously a true index to the average movement or position of all of the weights B, and consequently, the average amount of energy flowing through the meter during the preceding whole interval made up of the sub-intervals corresponding to the weights in question.

By varying the lead of the screw on the scale beam 6, the magnitude of the weights B, the dimensions or material of the spring 8, or by varying the transmission ratio between the member C and the stylus 1, or by varying the spacing of the division lines on the chart or the numerical values used in connection with the division, the instrument may be adapted for use with various watt-hour meters having widely different watt-hour constants. In one case the instrument might be used in connection with a watt-hour meter in which each revolution of the moving element equals one one-hundredth kilowatt-hour; while in another case it might be used with a meter in which each revolution equals one kilowatt-hour. Each instrument may be calibrated with the meter with which it is to be used, but this is not essential.

The numerals on the chart of the instrument may be arranged to express average rate of flow during the prescribed interval in some suitable unit, for instance, kilowatts; or, if desired, the numerals may be arranged to express kilowatt-hours passed during the prescribed interval. If both average and integrated values are required, each division line of the scale or chart should be provided with two sets of numerals as shown in Fig. 1, preferably printed in different colors, the one expressing average rate of flow in kilowatts represented by the letters K. W., the other integrated values, for instance, kilowatt-hours. The member C is connected to the table E by a slot and pin connection, or in any other suitable way, as shown in Fig. 1, so that it will revolve with said table, and means is provided for rotating the table E either continuously or intermittently, the means herein shown for rotating said table consisting of a pawl and ratchet mechanism designated by the reference character F in Fig. 1 that is actuated by a cam 9 driven by a clock mechanism or other form of motor arranged in a housing 10. The instrument herein shown is provided with thirty-two weights B, thirty of which represent the prescribed interval of demand, and each of which represents a sub-interval or division of the prescribed interval of demand. If the instrument is arranged for a fifteen minute period or interval of demand, as herein shown, then each of the weights B will represent a sub-interval of one-half minute, the purpose of equipping the instrument with thirty-two weights instead of thirty being to insure extreme accuracy, as hereinafter described. When the instrument is in operation, however, only thirty of the weights will be effective at the same time, and two of the weights will always be ineffective. The table E is driven at such a speed that it will make one complete revolution every sixteen minutes, and at each step or movement of said table, provided, of course, that the meter is in operation, one of the weights B is moved from the zero or inoperative position into an operative position toward the member C, so as to cause the scale beam on which the weight is mounted to exert more or less downward pressure on the member C, according to the degree of movement imparted to the weight.

Various means may be employed for shifting the weights B into operative position, but I prefer to use a means that is controlled either directly or indirectly by the meter A. In the form of my invention shown in Fig. 1 the measuring meter A is provided with an actuating shaft 11 whose movement or rotative speed is governed by the current flowing through said meter, and said shaft 11 is equipped with a magnet 12 that coöperates with armatures 13 on the outer ends of the scale beam 6 to rotate said scale beam and thus cause the weights thereon to move inwardly toward the member C, each of the scale beams being provided with screw threads that coöperate with screw threads on its coöperating weights, and the table E being provided with radially-disposed guide grooves or slots that receive guiding portions 14 on the weights, and thus prevent them from turning with the scale beams when the scale beams are rotated. A restoring mechanism is provided for moving the weights B outwardly away from the member C into a zero or an inoperative position, the restoring mechanism shown in Figs. 1 and 2 consisting of a constantly rotating magnet 15 that coöperates with the armatures on the ends of the scale beams and which is rotated in an opposite direction to the magnet 12 by a belt 16 or other suitable driving means. The restoring mechanism 15 is arranged in such a position that the armatures on the scale beams will move into alinement with same before said armatures reach the position where they are acted upon by the magnet on the driving shaft 11 of the meter A, so as to cause each weight to be restored to its zero or inoperative position before it reaches the means that causes the weight to become more or less operative. At each step or movement of the table E one of the weights is moved into a more or less operative position and one of the weights is moved into an inoperative position, and in order that said weights will not influence the member C, I have provided the instrument with a loading and unloading platform 17 that supports the weights while they are being positioned by the actuating shaft 11 of the meter A, and while they are being restored to an inoperative position by the restoring device 15. As shown in Figs. 1, 2 and 4, the platform 17 is arranged underneath the table E in proximity to the oppositely-rotating magnets 12 and 15. The top edges of said platform are oppositely-inclined so that when the table is in operation the weights will be raised slightly in traveling over said platform, thus causing the inner ends of the scale beams to move upwardly slightly or into such a position that they will not exert downward pressure on the member C. As shown in Fig. 1, the outer end portions of the scale beams 6 fulcrum on the flange 7 of the table E, and the inner ends of said scale beams pass through vertically-disposed, elongated slots in the member C, so as to provide for the movements of the scale beams just referred to. It is, of course, not essential to the successful operation of my invention that the instrument be provided with a greater number of weights than the actual number of sub-time-intervals which collectively constitute the prescribed interval of demand, as a fairly accurate reading would be obtained in the instrument herein shown if it were provided with only thirty weights. By using thirty-two weights, however, I obtain greater accuracy, as the weight which is being restored to an inoperative position and the weight that is being rendered operative or being positioned by the rate or quantity of flow of the commodity passing through the measuring meter will both be ineffective during the loading and unloading period, thereby causing the number of active weights to correspond to the number of sub-time-intervals, which collectively make up the prescribed interval of demand.

In principle of operation the instrument above described is analogous to that of a spring scale with a flat, horizontal pan or platform wide enough to accommodate thirty blocks, each of equal width, but possibly of widely different weight. Arranged on opposite sides of and approximately flush with the top surface of the scale platform are two stationary platforms which come quite close to, but do not contact with the scale platform. The blocks are arranged close together in a row across the top of the scale platform, and at the end of each half-minute a block of greater or lesser weight is pushed onto the platform, causing the whole row to move, and thus push off a block on the opposite side of the scale platform.

It is obvious that the spring scale will at all times indicate the total weight of the thirty blocks on the platform, or, by changing the numerical value of the graduations on the scale's dial, the average weight of the thirty blocks may be directly read at any time.

When the instrument is first set in operation the actuating shaft 11 of the meter A will rotate the scale beam 6 that is arranged in longitudinal alinement with same, and thus cause the weight B on said scale beam to move inwardly toward the member C an amount or degree directly proportional to the number of revolutions of the shaft 11, which, of course, rotates in direct proportion to the value of the current passing through the meter A. At the end of a half minute the table E is given a step forward, so as to bring another scale beam into alinement with the actuating shaft 11, these operations being repeated at intervals of one-half minute. At the end of fifteen minutes thirty of the weights B will be operative, and all of said weights will coöperate with each other to exert downward pressure on the member C, and in view of the fact that said member C is operatively connected with the pen or stylus 1 of the recording mechanism, said mechanism will express the average position of the weights B. In the instrument herein shown this average position is represented in the recording mechanism by kilowatts of electrical energy. At the next step or movement of the table E the weight B which was first rendered operative moves onto the platform 17, and the weight B which was being positioned during the previous dwell of the table E then becomes operative, or, in other words, exerts downward pressure on the member C. Assuming that some current is flowing through the meter at all times, thirty of the weights B will be operative and two of the weights will be ineffective, the two ineffective weights being the ones that are being moved into and out of operative position.

If current at the rate of 200 kilowatts is passed through the meter during the first fifteen minutes the instrument is in operation, the stylus 1 of the recording mechanism will move obliquely from zero in a substantially straight line, over the chart 2, and at the end of the first fifteen minutes will stand at the line on the chart marked 200, indicating that the average flow for the preceding fifteen minutes has been 200 kilowatts. The total integrated quantity of current passed through the meter during this fifteen minute period was 50 kilowatt-hours. From the above it is obvious that if it were desired that the instrument express both the average rate expressed in kilowatts and the total integrated quantity expressed in kilowatt-hours, that two sets of numerals would be necessary, in the present example the integrated value in each case being one-fourth the average value. If the rate at which current is passed through the meter is reduced to 100 kilowatts at the termination of the fifteenth minute the instrument is in operation, the two weights B, which are rendered operative during the sixteenth minute, will be moved inwardly on their scale beams 6 only one-half the distance, thus reducing the downward pressure on the member C, causing the stylus 1 to move a slight distance toward zero, or away from the kilowatt line on the chart marked 200. If this same rate of 100 kilowatts is maintained for the succeeding fourteen minutes, the stylus 1 will then stand at the kilowatt line on the chart marked 100, at the end of the second fifteen minute period, or, in other words, at the end of the first half hour the instrument is in operation, due, of course, to the fact that the total rate during the preceding fifteen minutes averaged 100 kilowatts, the integrated quantity passed during the second fifteen minutes amounting to 25 kilowatt-hours. In the above description I have referred to the first fifteen minute and the second fifteen minute period the instrument is in operation merely for the purpose of simplifying the description. I wish it to be understood, however, that my instrument is not designed to indicate or record the maximum average demand during one of a series of predetermined time blocks or clock intervals, but, on the contrary, is so designed that it indicates or records the average demand during a constantly shifting interval of fixed length or duration, beginning at any time, and shows the average amount of the commodity consumed during a time interval that is measured backward from any instant of observation, or the scale may be calibrated to express the total integrated quantity metered during the corresponding interval expressed in some suitable unit, for instance, kilowatt-hour, or by providing each division line on the chart with two numerals, both the average and integrated values may be expressed. For example, if the observation is made at the end of the twenty-second minute, the instrument is in operation, instead of at the end of the first fifteen minutes, or the end of the second fifteen minute period, as in the example previously given, the stylus 1 will stand about midway between the lines on the chart marked 100 and 200 kilowatts, thus indicating that the average rate for the preceding fifteen minutes is 152.33 kilowatts, while the integrated value during the corresponding interval would be 38.33 kilowatt-hours. From the foregoing it will be seen that my improved instrument will show at all times the resultant or average value of all the current which has passed through the meter A during a given period preceding the instant of observation, because the prescribed interval of demand is subdivided into a number of divisions or short sub-intervals, a certain number of which, taken collectively and in consecutive order, represent the prescribed interval of demand. In other words, in an instrument of the character described the period or interval of demand is of constant duration, but it shifts continually, or rather, at one-half minute intervals when the instrument is in operation.

Instead of using the meter A to operate directly the device 12 that moves the weights B into operative position, said meter could be used to control a separate and distinct mechanism that operates the device 12, and therefore, in Fig. 3 of the drawings I have illustrated an instrument constructed in accordance with my invention in which some movable part of the meter A is used to open and close an electric circuit $w$ equipped with a solenoid or other suitable electrically-operated means 18 that rotates the device 12, so as to move each of the weights B in direct proportion to the number of revolutions of the meter A at the time said weight is being operated on by the device 12, or an arrangement could be provided in which the meter at each revolution or fraction or multiple thereof acted to release some external source of power which moves the weights, for example, a spring or weight-driven clockwork mechanism.

In the form of my invention shown in Figs. 5 and 6 a plurality of movable elements positioned by the measuring meter A coöperate with resistance units to increase or decrease the resistance in an electric circuit in which is arranged a recording mechanism D' and a demand indicator G, said demand indicator having two hands 19 and 20, one of which, namely, the hand 19, moves toward and away from zero on the dial, according to the variations in the flow of the current passing through the instrument, and the other, the hand 20, moving progressively over the dial of the indicator as the flow of the current increases, so as to act as a maximum indicating device that indicates the greatest average flow during any demand interval of a fiscal period, such, for example, as one month, Said instrument comprises a constantly or intermittently rotating table E', an actuating device $12^a$ operated either directly or indirectly by a measuring meter A', a restoring or resetting device $15^a$ operated by a driving belt or other suitable means and a plurality of resistance units $6^a$, all of which are connected either in multiple or in series to two common slip rings 21 and 22 which act as bus bars. Each of the resistance units $6^a$ is equipped with a sliding contact B' that is mounted on a screw-threaded shaft 23 journaled in the table E' and provided at its outer end with an armature $13^a$. The resistance units $6^a$ are arranged radially on the table E', and as said table revolves, preferably step-by-step, the armatures on the outer ends of the shafts 23 move progressively into position to be engaged by the restoring device $15^a$ and the actuating device $12^a$ in practically the same manner as in the instrument shown in Fig. 1. As the sliding contact B' of each resistance unit is moved toward the center of the table E', the resistance of that unit is gradually cut out, and as all of said units are in multiple, the reading of the demand indicator or demand recorder gives the true index to the average movement of all of the sliding contacts B. In other words, the current flowing through the instrument from a source of fixed or constant voltage would vary up or down directly according to the average position of all the sliding contacts B', thus indicating the average flow of energy through the watt-hour meter A' during the interval of demand. In order to increase the accuracy of the instrument, provision is made for disconnecting from the circuit those resistance units which are being "loaded" or "unloaded," this being effected in the instrument shown in Figs. 5 and 6 by means of a cam block $17^a$ arranged in position to be engaged by a group of slidable pins 24 on the table E', each of which coöperates with a spring contact 25 on one of the resistance units. When the instrument is in operation the spring contacts 25 of the two resistance units $6^a$ that are being acted upon by the actuating device $12^a$ and the restoring device $15^a$ will be held in their open position by means of the cam block $17^a$ and the coöperating pins 24, so as to disconnect these two units from the circuit.

In the form of my invention illustrated in Fig. 11 the instrument comprises a yieldingly-supported member C' whose position is governed by a plurality of spring arms 30 carried by a rotatable table 31 and combined with a means that varies the tension of said spring arms according to the rate of flow of the commodity passing through the measuring meter with which the instrument is used. As shown in said figure, each of the arms 30 is engaged intermediate its ends by an adjustable element 32 mounted on a screw-threaded shaft 33 provided with an armature 34 that is adapted to be engaged by magnets similar to those illustrated in Fig. 1, so as to rotate said shaft in opposite directions, and thus cause the adjustable element 32 to change the tension of the spring arm 30 with which it coöperates.

Figure 12:
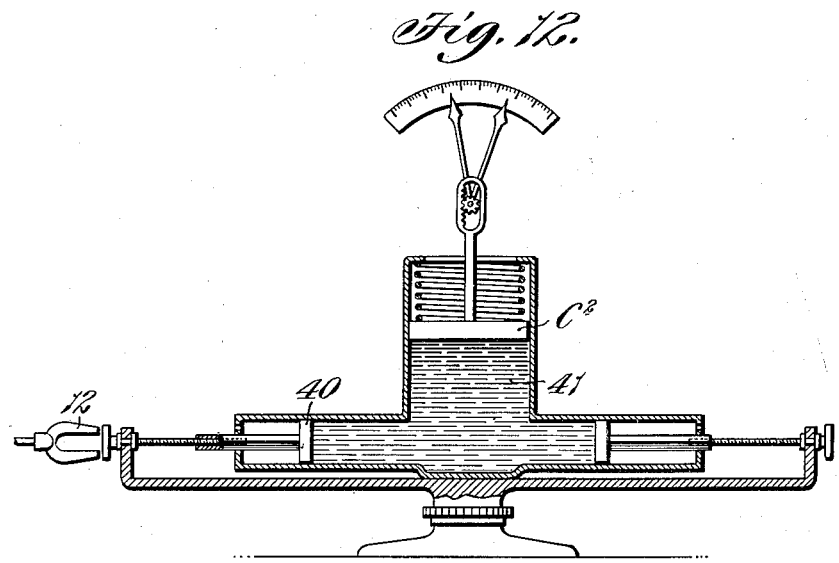

In the form of my invention illustrated in Fig. 12 the instrument is provided with a plurality of elements 40 that represent sub-time-intervals or divisions of the prescribed interval of demand, which elements consist of pistons or plungers that are moved in a manner similar to the weights B of the instrument shown in Fig. 1, so as to displace a body of liquid 41 that acts on a spring-pressed member $C^2$ which is combined with an indicating mechanism.

Figure 13:
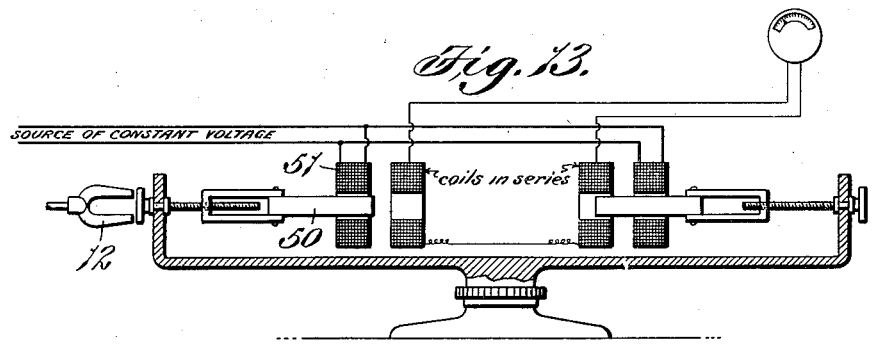

In the form of my invention shown in Fig. 13, the instrument is provided with elements representing sub-time-intervals or divisions of the prescribed interval of demand, and each of which consists of a transformer. When the instrument is in operation the relative positions of the cores 50 and coils 51 of the transformers is varied according to the rate of flow of the commodity passing through the measuring meter, the coils of the transformers being connected in series and all of said coils being connected up to a recording or indicating mechanism.

Figure 14:
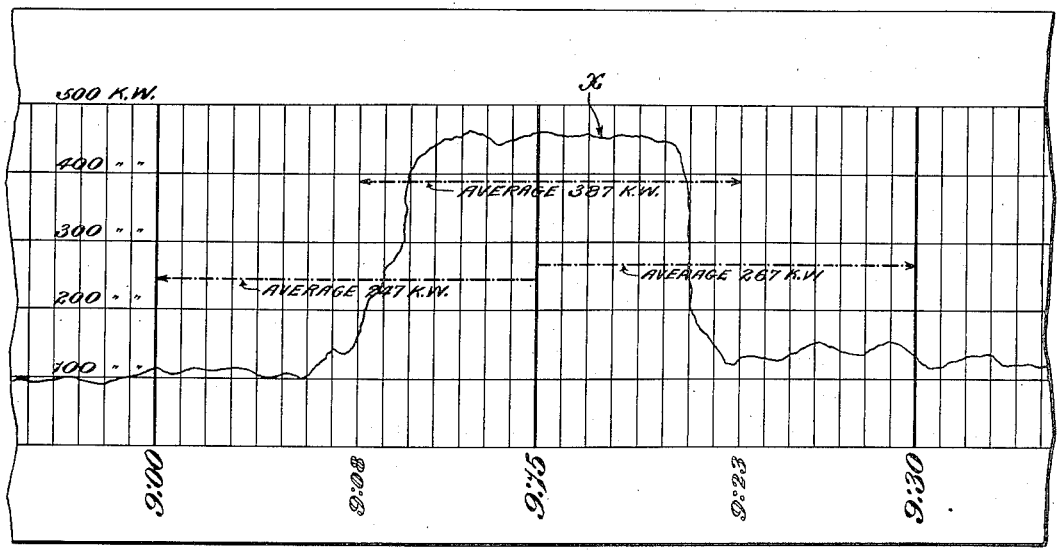
Fig. 14 is a diagram, illustrating a hypothetical load curve.
Figure 15:
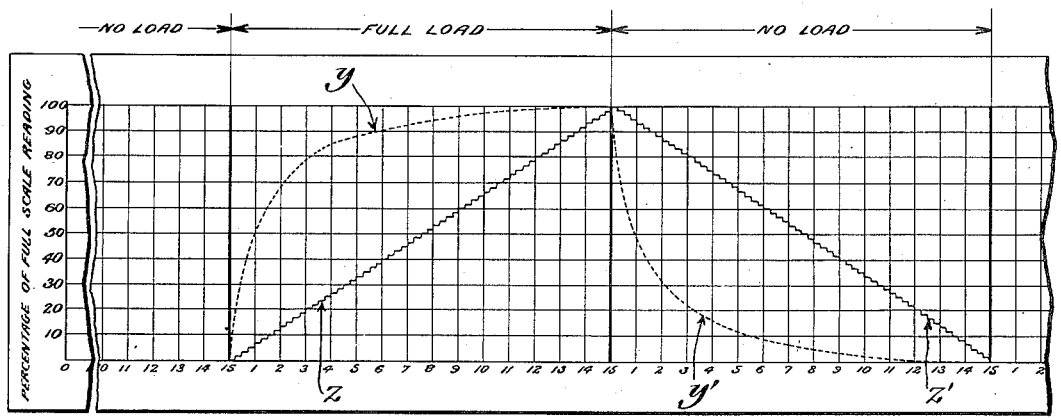
Fig. 15 is a chart indicating curves produced by a thermal instrument and by my improved instrument.

In order to bring out more clearly the desirable features of my improved maximum demand instrument, I have shown in Fig. 14 of the drawings a diagram illustrating a hypothetical load curve and have shown in Fig. 15 of the drawings a chart provided with curves produced by a thermal instrument and by my improved instrument.

As previously stated, one class of maximum demand instruments heretofore in use comprised a watt-hour meter and a clockwork mechanism to record all of the integrated demands over a series of separate, non-lapping time blocks or clock intervals, consecutive, equal and predetermined. As shown in Fig. 14 of the drawings, an instrument of the character just referred to would show an average demand of two hundred and forty-seven kilowatts occurring between 9:00 o'clock and 9:15 and an average of two hundred and sixty-seven kilowatts occurring between 9:15 and 9:30. The curved line $x$ on said diagram, however, shows that the actual maximum average demand occurred between 9:08 and 9:23 and that said actual demand averaged three hundred and eighty-seven kilowatts during that period. It will thus be seen that where a shift in the beginning and termination of the time interval from 9:00 to 9:15 or 9:15 to 9:30 in the first case to 9:08 to 9:23 in the second case, results in an increase in the readings of from two hundred and forty-six and two hundred and sixty-seven, respectively, to three hundred and eighty-seven kilowatts, or an average error referred to the true reading of about thirty-four per cent., an error of 50% is theoretically possible. In my improved instrument the recording or indicating mechanism would express the actual maximum demand of three hundred and eighty-seven kilowatts, while in an instrument of the kind heretofore in use, which operates on arbitrary clock intervals, the reading would be only two hundred and sixty-seven kilowatts, thus resulting in great loss to the company supplying the electrical energy to the consumer, or inequality in rate as between one consumer and another.

Thermal instruments also fail to record or indicate the actual maximum integrated demand for the time interval preceding the instant at which the observation or record is made, on account of the fact that when a current of constant value begins and continues to flow through it the indications or readings resulting from the temperature rise will represent points on an upwardly-swinging hyperbolic or logarithmic curve, as indicated by the curve $y$ on the chart shown in Fig. 15. If the reading is made at any point before equilibrium is reached the reading will not be the true average value for the preceding interval. Likewise, if the current flowing through the instrument is reduced in value or cut off completely, the indications or readings resulting from the temperature drop will represent points on a downwardly-swinging hyperbolic or logarithmic curve, as indicated by the curve $y'$ in Fig. 15. In my instrument the indicating or recording device of the indicating or recording mechanism follows a straight line curve or law following any change in the quantity of the medium passing through the measuring meter, as indicated by the lines $z$ and $z'$ in Fig. 15. Assuming that a full load is applied after a no load period, the hand or recording device of the indicating or recording mechanism of my instrument will move obliquely over its coöperating chart in a substantially straight line until equilibrium is reached, and if the load is cut off as soon as equilibrium is reached, said hand or recording device will move obliquely in the reverse direction in a substantially straight line, as indicated in Fig. 15 of the drawings. It will thus be seen that in my improved instrument an increase to a higher but constant flow in the amount of the energy passing through the measuring meter results in an increase in the record or indication in the instrument which follows a straight line curve or law during the period of readjustment, the reading, no matter at what instant made, representing the substantially true average of value of all of the energy that has passed through the immediately measuring meter during the preceding interval of demand for which the instrument is designed. Furthermore, in such an instrument, the angle or steepness of the ascending curve appearing on the recording or indicating mechanism varies with the value of the increment in the amount of the energy passing through the measuring meter.

To emphasize further the distinction between my improved instrument and the predetermined clock interval instruments previously referred to, I have illustrated in Figs. 16, 17 and 18 of the drawings a diagram showing variations in the flow of energy, a record made by my instrument and a record made by a predetermined clock interval instrument, respectively. By referring to said diagram, it will be noted that at 7:15 the power was turned on and that the instrument was subjected to a load of thirty-three and one-third per cent. of full rated load for a period of five minutes, at the end of which period the power was cut off. At 7:25 the full load was thrown on, maintained for five minutes and then cut off at 7:30. After a lapse of five minutes the power was again turned on and for the succeeding five minutes the load was thirty-three and one-third per cent. Thereafter, the load was increased to sixty-six and two-thirds per cent. and maintained for a period of five minutes and then at 7:45 the full load was thrown on and maintained for a period of five minutes. At 7:55 the full load was thrown on and maintained for fifteen minutes or until 8:10. After another lapse of five minutes the system was again subjected to a load of sixty-six and two-thirds per cent. for a period of ten minutes. The greatest demand made on the system for any fifteen minute interval occurred between 7:55 and 8:10, at which interval the demand was one hundred per cent. The record illustrated in Fig. 18 does not indicate this, but on the contrary, indicates incorrectly that the greatest demand was sixty-six and two thirds per cent.,—a loss of thirty-three and one-third per cent. The reason for this error of course is due to the fact that the interval of greatest demand did not coincide with one of the arbitrary time block intervals, but lapped over two of the time block intervals beginning at 7:55 instead of 8:00 and terminating at 8:10 instead of 8:15. The record produced by applicant's instrument, however, shows correctly that the greatest demand for any fifteen minute interval was one hundred per cent. and that said demand occurred during the fifteen minute interval preceding ten minutes past eight o'clock.

In addition to the desirable features above mentioned, my improved instrument determines the average rate at which energy passes through the measuring meter during a prescribed interval in which the reading will at all times be truly proportionate to the average rate at which the energy has passed through the meter, a reading taken at any instant referring to an interval terminating at that instant, and the length of the interval corresponding to the demand interval for which the instrument is particularly constructed. Furthermore, in my improved instrument if the amount of energy passing through the measuring meter is increased to a higher but constant value, the hand or recording device of the indicating or recording mechanism of the instrument will immediately begin to ascend and will continue to ascend until equilibrium is reached, there being no further change in said hand or recording device after equilibrium is reached, if the amount of energy passing through the measuring meter remains constant at the higher value. Likewise, if the amount of energy passing through the measuring meter is decreased to a lower but constant value, said hand or indicator will immediately begin to descend and will continue to descend in direct proportion to the drop in the energy passing through the measuring meter. My instrument also possesses the desirable characteristic of being able to be checked up so as to ascertain whether the scale reading is correct. In other words, in my instrument the elements that represent sub-intervals of the prescribed interval of demand are so constructed and are so combined with the recording or indicating device that when all of the active elements are inoperative said device will stand at zero, and when all of the active elements are in their opposite extreme operative position, said indicating or recording device will be in its maximum position. If desired, suitable marks could be provided at intermediate points on the scale beams for checking intermediate points on the indicating dial or chart. Consequently, the accuracy of the scale reading of the instrument can be checked up by moving the said elements manually to zero intermediate and full scale positions or into engagement with the means that limits the movement of said elements in opposite directions.

Apparently losing sight of the fact that the prime movers and their auxiliaries, together with buildings and foundations, constitute about 80% of the total cost of generating equipment, some authorities contend that it is logical and desirable to measure maximum demand in amperes or volt-amperes, rather than watts.

Having thus described my invention, what I claim, and desire to secure by Letters Patent, is:

1. A maximum demand instrument in which the demand interval is made up of a number of sub-intervals of equal duration, a means whose condition or position is varied more or less during each sub-interval accordingly as the speed or rate of operation of the device with which the instrument is used varies during said sub-interval, and an indicating mechanism combined with said means in such a manner that it shows or expresses the aggregate number of integrated units or average speed or rate of operation of said device during a number of sub-intervals, which, taken collectively, represent the demand interval.

2. A maximum demand instrument in which the demand interval is made up of a number of sub-intervals of equal duration, a means whose condition is varied more or less during each sub-interval in direct proportion to the variation in the speed or rate of operation of the device with which the instrument is used during said sub-interval, and means which shows or expresses the average of the variations produced in the condition of said means during a number of sub-intervals that represent the demand interval.

3. A maximum demand instrument in which the demand interval is made up of a number of sub-intervals of equal duration, a means that represents variations in the speed or rate of operation of the device with which the instrument is used, and means controlled or operated by said device for causing the condition of said means to vary during each sub-interval in direct proportion to the speed or rate of operation of said device during said sub-interval.

4. A maximum demand instrument, comprising an indicating mechanism, and means controlled by the machine or device with which the instrument is used for causing said indicating mechanism to show at all times the closely approximate average rate of operation of said machine or device during a prescribed interval of time immediately preceding the instant at which said indicating mechanism is observed, which observation may be made at any time without regard to any arbitrary or predetermined clock interval.

5. A maximum demand instrument adapted to be used with a metering or counting device and comprising an indicating mechanism, and means controlled by the device with which the instrument is used for causing said mechanism to show directly at any instant at which it is observed the closely approximate average rate of passage of the thing being metered or counted during an interval of prescribed duration immediately preceding the instant of observation.

6. A maximum demand instrument, comprising an indicating mechanism, and means that causes said mechanism to record or indicate the average value, quantity or volume of a commodity that passes through a measuring meter during an immediately preceding interval made up of a number of sub-intervals of equal duration, at the termination of each of which the average is apt to change.

7. A maximum demand instrument provided with means that represents a prescribed demand interval, said means comprising a plurality of elements, each of which represents an equal sub-interval of the demand interval, and means for causing the condition or position of said elements to change progressively during the different sub-intervals and in direct proportion to the rate or speed of operation of the device with which the instrument is used during the different sub-intervals.

8. A maximum demand instrument provided with a plurality of elements, a certain number of which, when taken collectively, represent the prescribed demand interval, means whereby during each sub-interval the condition or position of one of said elements is changed or varied in direct proportion to the variation of the speed or rate of operation of the device with which the instrument is used during said sub-interval, and means that shows or expresses at all times the average speed or rate of operation of said device during a number of sub-intervals which, collectively, represent the demand interval.

9. A maximum demand instrument adapted to be used in connection with a measuring or counting meter and comprising elements that represent sub-intervals of the prescribed demand interval, means for causing the position or condition of said element to change more or less according to the variation in the flow of a commodity through the meter or variations in the operation of the meter, and means for determining at all times the average condition or position of a certain number of said elements.

10. A maximum demand instrument adapted to be used in conjunction with a measuring meter and provided with movable elements whose position or condition is changed more or less by said measuring meter, an indicating mechanism, and means for causing said mechanism to express the average value, quantity or volume of the medium passed through the measuring meter during an interval made up of a number of sub-intervals of time.

11. A maximum demand instrument provided with a relatively large number of elements, each of which represents one subdivision of the prescribed demand interval, a measuring meter, means whereby the condition or position of said elements will change automatically according to variations in the rate of flow of the commodity passing through the measuring meter, and means for determining at all times the average condition of a certain number of said elements.

12. A maximum demand instrument provided with an indicating mechanism, means for changing the condition of said mechanism, and a plurality of elements controlled by a measuring meter combined with said means in such a manner that said indicating mechanism expresses the average position or condition of said elements.

13. A maximum demand instrument provided with a plurality of elements that become operative progressively to represent the operation of a measuring or counting meter at certain intervals, and an indicating mechanism which expresses the average condition or position of a certain number of said elements.

14. A maximum demand instrument, comprising a plurality of elements, each of which represents a sub-interval or division of the prescribed demand interval, means controlled by a meter for causing said elements to become operative, and means whereby one of said elements is rendered effective and one is rendered ineffective at stated intervals.

15. A maximum demand instrument adapted to be used with a measuring meter and comprising a plurality of elements, each of which represents a sub-interval, or division of the prescribed demand interval, the total number of said elements exceeding the total number of divisions of the prescribed demand interval, an indicating device whose position changes according to the condition or position of said elements, and means whereby when the instrument is in normal operation the number of said elements that are operative will correspond to the number of divisions of the prescribed demand interval.

16. A maximum demand instrument, comprising a plurality of elements, each of which represents a sub-time-interval and a certain number of said elements, when taken collectively, representing the prescribed demand interval, means for causing the position or condition of said elements to change consecutively more or less according to the value, quantity or volume of a medium passed through the measuring meter with which the instrument is used, an indicating device that expresses the average condition of a certain number of said elements, and means for preventing said device from being influenced by said elements when they are being rendered effective and ineffective.

17. A maximum demand instrument in which the prescribed or agreed demand interval is made up of a number of sub-intervals, an indicating mechanism, an operating means for said mechanism, and means controlled by the machine or device with which the instrument is used for changing the condition of said operating means more or less during each sub-interval according to the speed of the machine or device with which the instrument is used so as to cause said indicating mechanism to show at all times the average rate of operation of said machine or device during a demand interval immediately preceding the instant at which said indicating mechanism is observed.

18. A maximum demand instrument comprising an indicating mechanism provided with a movable device, and an operating mechanism for said device adapted to be rendered operative by the passage of energy through the measuring meter with which the instrument is used and provided with means for causing said device to at all times give a reading that is truly proportional to the average rate at which the energy passed through the measuring meter during an immediately preceding interval of prescribed duration.

19. A maximum demand instrument provided with an indicating device, and an operating mechanism for said device adapted to be rendered operative by the passage of energy through the measuring meter with which the instrument is used and comprising means for causing said device to at all times express the average rate at which the energy passed through the measuring meter during an immediately preceding interval made up of a number of sub-intervals of equal duration, at the termination of each of which the average is apt to change.

20. A maximum demand instrument adapted to be used with a metering or counting device and comprising elements that represent sub-intervals of the prescribed demand interval, means for causing the condition or position of said elements to change more or less according to variations in the rate of operation of the device with which the instrument is used, and means for determining at all times the average condition or position of a certain number of said elements.

21. A maximum demand instrument adapted to be used in connection with a measuring meter and comprising elements that represent sub-intervals of the prescribed demand interval, an indicating device, and means that coöperates with said device and with said elements for causing said device to express at all times the true average rate at which energy has passed through the measuring meter during a prescribed time interval, measured backward from the instant at which the record or observation is made.

22. A maximum demand instrument in which the demand interval is made up of a certain number of sub-intervals of equal duration, a means whose condition is varied during each sub-interval in direct proportion to the variation in the speed or rate of operation of the device with which the instrument is used during said sub-interval, and an indicating mechanism controlled by said means and provided with two indicators, one of which shows the aggregate or average speed or rate of operation of said device during an interval of prescribed duration immediately preceding the instant of observation, and the other showing the highest position assumed by the first mentioned indicator during a fiscal period.

23. A maximum demand instrument provided with a movable indicating device, and means whereby an increase to a higher but constant value in the amount of energy passing through the measuring meter with which the instrument is used causes said device to follow a straight line curve or law and show the substantially true average value of all of the energy that has passed through the measuring meter during the immediately preceding demand interval for which the instrument is designed.

24. A maximum demand instrument provided with an indicating mechanism that comprises a movable element, and means whereby a decrease to a lower but constant value in the amount of energy passing through the measuring meter with which the instrument is used causes said movable element to follow a straight line curve or law and show the substantially true average value of all of the energy that has passed through the measuring meter during the immediately preceding demand interval for which the instrument is designed.

25. A maximum demand instrument provided with an indicating device, and an operating mechanism for said device including shiftable elements that are adapted to be moved more or less when the instrument is in operation and which can be arranged in their extreme positions when the instrument is not in use so as to enable the accuracy of the scale reading of the instrument to be checked up.

26. A maximum demand instrument, comprising an indicating device, a means that causes the position of said device to change, and a plurality of elements representing sub-intervals of the prescribed demand interval that govern said means, said elements being so arranged that they can be moved into zero position and into maximum position or into any intermediate position to check up the accuracy of said recording or indicating device.

27. A maximum demand instrument adapted to be used in connection with devices of the character referred to, comprising elements that represent sub-intervals of the prescribed demand interval, means for causing the position or condition of said elements to change according to variations in the rate of movement of the device with which the instrument is used, and means for determining at all times the aggregate or average condition or position of a certain number of said elements.

28. A maximum demand instrument provided with a plurality of elements that become operative progressively to represent the rate of movement of the device with which the instrument is used, and means for expressing the average condition or position of a certain number of said elements.

29. A maximum demand instrument adapted to be used with a metering or counting device, said instrument comprising a plurality of elements which at equal successive sub-intervals are brought one by one under the control of said device, and means for causing the condition or position of said elements to be varied more or less, depending upon the speed or rate of operation of said device during the various sub-intervals.

30. A maximum demand instrument in which the prescribed interval of demand is divided into a relatively large number of equal sub-intervals, elements that represent said sub-intervals, means for bringing said elements one by one, successively, under the control of the machine or device with which the instrument is used, means for causing the condition or position of each of said elements to be changed more or less when it is under the control of said device in proportion to the speed or rate of operation of said device during said sub-interval, a resetting means for restoring said elements, one by one, successively, to the position or condition they were in before they were brought under the control of said device, said resetting means being so constructed that it becomes operative after each element has remained in a changed position or condition for a period corresponding to the demand interval, and a movable member common to all of said elements on which said elements co-act after being positioned or changed by said device.

31. A maximum demand instrument in which the prescribed interval of demand is divided into a relatively large number of equal sub-intervals, elements that represent said sub-intervals, means for bringing said elements one by one, successively, under the control of the machine or device with which the instrument is used, means for causing the condition or position of each of said elements to be changed more or less when it is under the control of said device in proportion to the speed or rate of operation of said device during said sub-interval, a resetting means for restoring said elements one by one, successively, to the position or condition they were in before they were brought under the control of said device, said resetting means being so constructed that it becomes operative after each element has remained in a changed position or condition for a period corresponding to the demand interval, a movable member common to all of said elements on which said elements co-act after being positioned or changed by said device, and an indicating means combined with said movable member for expressing the average rate of operation or speed of the device with which the instrument is used during the demand interval immediately preceding the instant at which the observation is made.

32. A maximum demand instrument in which the prescribed interval of demand is divided into a relatively large number of equal sub-intervals, elements that represent said sub-intervals, means for bringing said elements one by one, successively, under the control of the machine or device with which the instrument is used, means for causing the condition or position of each of said elements to be changed more or less when it is under the control of said device in proportion to the speed or rate of operation of said device during said sub-interval, a resetting means for restoring said elements one by one, successively, to the position or condition they were in before they were brought under the control of said device, said resetting means being so constructed that it becomes operative after each element has remained in a changed position or condition for a period corresponding to the demand interval, a movable member common to all of said elements on which said elements co-act after being positioned or changed by said device, and an indicating means combined with said movable member for expressing the average rate of operation or speed of the device with which the instrument is used during the demand interval immediately preceding the instant at which the observation is made, said indicating means comprising a maximum indicating device for showing the greatest amount of movement of said movable member.

33. A maximum demand instrument adapted to be driven or controlled by a metering or counting device and comprising a certain number of elements which are acted upon one at a time, consecutively, by said device during equal sub-divisions of time, the extent to which each element is acted upon being dependent upon the number of revolutions of the metering or counting device during the time it acts on said element, the indication of the instrument being dependent upon the average extent to which all of the elements are acted upon by the metering or counting device, rather than the extent to which any one element is acted upon, and the instrument being so constructed that all of the elements act together constantly upon a means which controls the indication of the instrument.

34. A maximum demand instrument, comprising a plurality of elements which are adapted to be brought one by one, consecutively, under the control of a watt-hour meter or other device, each for an equal sub-interval of time, the extent to which each element is acted upon by said meter being dependent upon the average rate at which energy flows through the meter during such sub-interval, a means common to all of said elements and acted upon by said elements after said elements have been acted upon by said meter, and an indicating mechanism combined with said means in such a manner that it expresses the average rate at which energy has passed through said meter during a prescribed interval made up of the total of all of said sub-intervals, the length of time that each of said elements co-acts with the means common to all of said elements corresponding to the length of the entire interval.

35. A maximum demand instrument for determining the average rate at which electrical energy flows through a watt-hour meter during a time interval of prescribed length, said instrument comprising a plurality of elements and the indication of said instrument at any instant of observation being dependent upon the condition or position of a certain number of said elements, which elements are consecutively changed in position or condition more or less under the control of the watt-hour meter, each element being acted upon by the watt-hour meter during a sub-interval of time which represents an equal sub-division of a greater interval of time, which greater interval corresponds to the prescribed or agreed demand interval.

36. A maximum demand instrument adapted to be used in connection with a measuring or counting meter and comprising elements that represent sub-intervals of the prescribed demand interval, means for causing the condition or position of said elements to change consecutively more or less but in direct proportion to the variation in the rate of flow of a commodity passing through the meter, and means whereby the average condition or position of a certain number of said elements, taken collectively, is employed to express the average rate of flow of said commodity through the measuring meter during a demand interval immediately preceding the instant of observation, regardless of when such observation is made.

37. A maximum demand instrument adapted to be used in conjunction with a measuring meter and provided with a plurality of movable elements whose positions or conditions are changed consecutively more or less by said measuring meter in proportion to the average rate of flow of the commodity passing through the measuring meter during a sub-interval, and means whereby the summation of changes in the position or condition of a given number of said elements is employed to express the average rate of flow of the commodity through the measuring meter, during a whole interval made up of a certain number of sub-intervals.

38. A maximum demand instrument, comprising a relatively large number of elements, a conveyer that carries said elements and which travels continuously or by steps in a circuit or cycle in such a manner that the elements are brought, one by one, consecutively, each for an equal sub-interval of time, under the control of a watt-hour meter, means for changing the position or condition of each element more or less, depending upon the number of revolutions made by the watt-hour meter during the corresponding sub-interval, an indicating device upon which all of the elements act in common after being changed in opposition or condition by the watt-hour meter, said indicating device being so calibrated and marked that its readings express continuously in some suitable term like kilowatts the average rate at which energy has passed through the watt-hour meter during a whole interval immediately preceding any instant of observation, the whole interval being represented by the time required for a certain number of elements to have been acted upon by the watt-hour meter, and a resetting device which restores each element to zero position or condition after it has been carried by the conveyer for a length of time equal to the whole interval.

39. A maximum demand instrument, comprising a relatively large number of elements, a conveyer that carries said elements and which travels in a circuit in such a manner that the elements are brought, one by one, consecutively, each for an equal sub-interval of time, under the control of a measuring device, each element being adapted to be changed in position or condition, more or less, depending upon the rate at which the commodity being measured passes through the measuring device during the sub-interval, an indicating device upon which all of the elements act in common in such a manner that it expresses the summation of effects or average effect of the measuring device upon the elements during a whole interval equal in length to the time required for the conveyer to make a complete cycle, and means for restoring each element to zero position or condition after it has been carried by the conveyer during a complete cycle.

40. A maximum demand instrument, comprising a relatively large number of elements equally spaced around a circle which elements are brought, one by one, consecutively, and for an equal sub-interval of time under the control of an integrating watt-hour meter, each element being adapted to be acted upon by said meter more or less in proportion to the number of revolutions made by the said meter during said sub-interval, a dial, a common member upon which all of the elements co-act continuously in such a manner that the average effect of the watt-hour meter on all of the elements is continuously indicated upon said dial, which dial is so calibrated and marked that its readings express the average rate at which electrical energy has passed through the watt-hour meter during a whole interval of time equal in length to the period required for all of the elements to pass a certain point, and a means for restoring each element to zero position or condition after it has been carried by the conveyer during a complete cycle.

41. A maximum demand instrument in which the demand interval is made up of a number of sub-intervals of equal duration, a means whose condition or position is varied more or less during each sub-interval accordingly as the speed or rate of operation of the device with which the instrument is used varies during said sub-interval, and an indicating mechanism combined with said means in such a manner that it shows or expresses the aggregate number of integrated units, for instance, kilowatt-hours, passed through said device during a number of sub-intervals, which, taken collectively, represent the demand interval.

42. A maximum demand instrument, comprising a plurality of elements, each of which represents a sub-time-interval and a certain number of said elements, when taken collectively, represent the prescribed demand interval, means for causing the position or condition of said elements to change consecutively, more or less, according to the value, quantity or volume of a medium passed through the measuring meter with which the instrument is used, an indicating device whose movement is proportional to the average change in the position or condition of a certain number of said elements, and a scale for the indicating device which is calibrated and marked to express the average rate of flow of the medium passed through the measuring meter during a demand interval made up of a certain number of sub-time-intervals.

Signed at St. Louis, Mo., this sixth day of May, 1916.

GEORGE D. POGUE.

---

It is hereby certified that in Letters Patent No. 1,265,247, granted May 7, 1918, upon the application of George D. Pogue, of St. Louis, Missouri, for an improvement in "Maximum-Demand Instruments," errors appear in the printed specification requiring correction as follows: Page 5, line 33, for the word "itnerval" read *interval;* page 10, lines 100–101, strike out the word "immediately"; same page, line 101, after the article "the" insert the word *immediately;* page 15, line 121, claim 38, for the word "opposition" read *position;* and that the said Letters Patent should be read with these corrections therein that the same may conform to the record of the case in the Patent Office.

Signed and sealed this 4th day of June, A. D., 1918.

[SEAL.]

F. W. H. CLAY,
*Acting Commissioner of Patents.*